United States Patent [19]

Yanagi

[11] Patent Number: 5,222,006
[45] Date of Patent: Jun. 22, 1993

[54] MAGNETIC HEAD AND CORE CHIP HAVING A MAGNETIC THIN FILM

[75] Inventor: Michio Yanagi, Chichibu, Japan
[73] Assignee: Canon Denshi Kabushiki Kaisha, Chichibu, Japan
[21] Appl. No.: 533,827
[22] Filed: Jun. 6, 1990

[30] Foreign Application Priority Data

Jun. 16, 1989 [JP] Japan .................................. 1-154169
Jul. 10, 1989 [JP] Japan .................................. 1-178329
Jul. 10, 1989 [JP] Japan .................................. 1-178330

[51] Int. Cl.⁵ ............................................. G11B 5/147
[52] U.S. Cl. .................... 360/126; 360/110; 360/120
[58] Field of Search .............. 360/110, 103, 120, 121, 360/126; 29/603

[56] References Cited

U.S. PATENT DOCUMENTS 4,701,819 10/1987 Inagoya et al. ...................... 360/122
5,086,553 2/1992 Goto et al. ........................... 360/103

FOREIGN PATENT DOCUMENTS 63-244305 10/1988 Japan .

OTHER PUBLICATIONS

Auger Spectroscopy Analysis of Metal/Ferrite Interface Layer in Metal-In-Gap Magnetic Head IEEE Transactions on Magnetics, vol. 24, No. 6, Nov. 1988.

*Primary Examiner*—John H. Wolff
*Attorney, Agent, or Firm*—Spencer, Frank & Schneider

[57] ABSTRACT

A magnetic head has a core body for defining a magnetic path, a pair of magnetic thin films deposited on a pair of opposing surfaces of the core body, a gap member deposited between the pair of opposing surfaces to define a magnetic gap, and a bonding member such as a glass disposed between the pair of magnetic thin films, thereby bonding the magnetic thin films. The angle between the surface on which the magnetic thin film is deposited and one side surface of the core body is made greater than in conventional magnetic heads. The bonding member directly bonds the pair of opposing surfaces of the core body to each other and not through the magnetic thin films. The softening temperature of the bonding glass or bonding member is varied in such a way that the softening temperatures are different between a portion in the vicinity of the magnetic gap and a portion remote from the magnetic gap, whereby the softening temperature at the above-described portion remote from the magnetic gap has a low softening temperature.

13 Claims, 14 Drawing Sheets

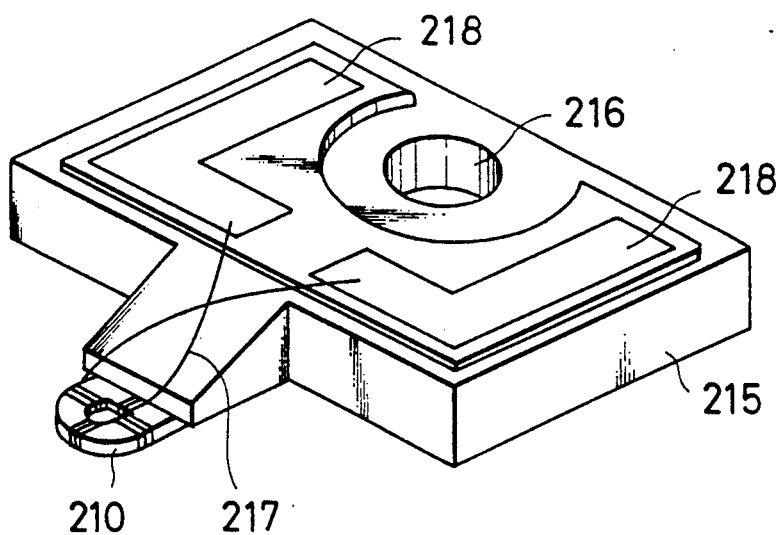
F I G. 15
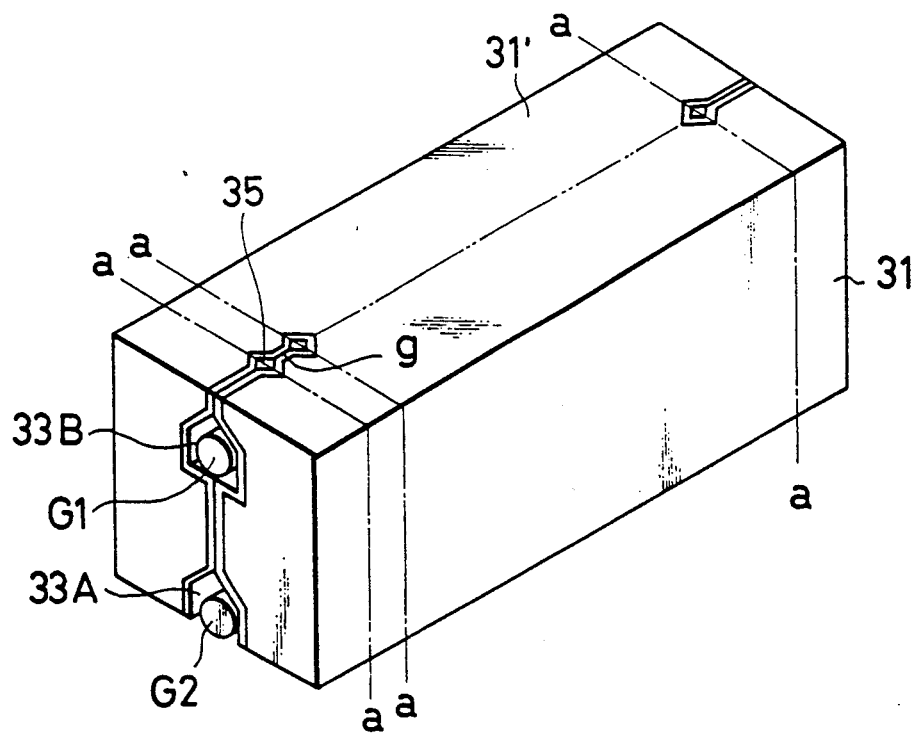
F I G. 16

MAGNETIC HEAD AND CORE CHIP HAVING A MAGNETIC THIN FILM

BACKGROUND OF THE INVENTION

1. Field of the Invention

The present invention relates to a magnetic head and core chip and more particularly to a magnetic head for writing and/or reading data onto and/or from a magnetic recording medium such as a metal tape in a video tape recorder (VTR), a digital audio tape recorder (DAT), a floppy disc drive (FDD) or the like.

2. Description of the Prior Art

Currently, units of the types described above tend to be compact with a high degree of picture quality and high fidelity in sound reproduction. This is consistent with the fact that magnetic recording medium have been reduced in size, shorter in recording wavelength and increased in packing density. Therefore, a so-called metal tape, which uses ferromagnetic metal powder as magnetic particles bonded thereon, and characterized by high coercivity and high residual magnetic flux density, has been used.

The materials of the magnetic head for writing and/or reading data onto and/or from the magnetic recording medium described above, need to have a high magnetic saturation density and to maintain high permeability in a high frequency range. As an example of a magnetic head made of the materials described above, well known is a so-called metal-in-gap type composite magnetic head (to be referred to hereinafter as a "MIG head") in which the core is mainly made of ferrite and in which thin films of a soft magnetic material such as Sendust having a high magnetic saturation density are formed in the vicinity of a gap.

In other words, for writing data onto a magnetic recording medium such as a metal tape, the magnetic field formed by the magnetic head needs to have a strength two or three times as high as the coercivity of the metal tape so that the materials for the magnetic head must have a high magnetic saturation density. For instance, the magnetic saturation density of a ferrite is of the order of 4500~5000 gauss, and when the coercivity of the magnetic recording medium is in excess of 1000 oersteds, it becomes impossible to effectively write data onto the magnetic recording medium. On the other hand, in the case of magnetic heads made of metal magnetic materials such as crystal alloys; Fe-Al-Si alloy (Sendust), Ni-Fe alloys (Parmaloy) and the like, or amorphous or noncrystal materials; Co-Nb-Zr, Co-Ta-Zr, Co-To-Hf and the like, their magnetic saturation density is generally higher than that of ferrite and the noise produced when the head is brought into sliding contact with the surface of the recording medium is less. However, the materials described above have a problem that, when the thickness of the film is in excess of 10 $\mu$m, the effective permeability at a high frequency (for instance, 5 MHz) becomes lower than that of ferrite because of eddy current loss so that the reproduction efficiency becomes low. In addition, the durability of the materials becomes less than that of ferrite. In view of the above, in MIG head, for mutually compensating for the defects of each of the various materials described above and the ferrite, in the case of making up a magnetic core, the ferrite and the metal magnetic material are combined. More specifically, the main body of the magnetic core is made of ferrite and magnetic thin films made of the metal magnetic material are grown in the vicinity of the gap by a film deposition in vacuum, whereby the magnetic core can be obtained.

FIG. 1 is a plan view illustrating the slide surface of a conventional magnetic head with which a surface of the magnetic recording medium contacts. In FIG. 1, reference numerals 1 and 1' represent ferrite portions; 4 and 4', soft magnetic thin films; 5 and 5', glass portions for joining the ferrite portions 1 and 1'; and g, a magnetic gap. A predetermined angle is defined between the magnetic gap g and a plane defined by the soft magnetic thin films 4, 4' over the slide surface, so that in case of poor magnetic layers which act as magnetic gaps being formed at the interfaces between the ferrite portions 1 and 1' and the soft magnetic thin films 4, 4', the undulation in the electromagnetic conversion characteristics (contour effect) due to the mutual interference of the signals derived from these gaps and the signal derived from the true gap g can be prevented. However, the production of such a magnetic head is complicated. Moreover, since the track width defined by the length of the gap g is determined by the thickness of the soft magnetic thin films 4, 4', in order to increase the width of the track, the thickness of the films 4, 4' must be increased (to 20-30 $\mu$m). As a result, the production cost of such a magnetic head rises.

FIG. 2 is a plan view illustrating the slide surface (the magnetic core) of another conventional MIG head. Soft magnetic thin films 8 and 8' are formed over the whole surfaces in mutually opposing relationship with each other on ferrite portions 1 and 1' comprising core body halves of a core body. In this case, the surfaces of the ferrite portions 1 and 1' over which the soft magnetic thin films 8 and 8' are formed in the vicinity of the magnetic gap g are substantially in parallel with the gap g. As a result, in case of increasing the width of the track, the thickness of the films 8, 8' remain thin (5-10 $\mu$m), and production of the films can be simplified. It has been apparent that by the arrangement of the magnetic core shown in FIG. 2 the contour effect can be reduced to a minimum by, for instance, suppressing the mutual interference between the ferrite portions 1, 1' on the one hand and the soft magnetic thin films 8, 8' on the other hand.

A magnetic head with the arrangement shown in FIG. 2 has many advantages, but there exists a problem that part of the magnetic core tends to be damaged during the production process.

More specifically, in the production of magnetic heads of the type described above with reference to FIG. 2, a block which has a plurality of arrangements similar to that shown in FIG. 2 extended repeatedly in the direction in parallel with the gap g is sliced to obtain a plurality of magnetic core chips. In this case, the soft magnetic thin films, the ferrite portions, and the glass portions are simultaneously sliced. As the strain caused by thermal stresses due to the difference in the coefficients of expansion between the films and the ferrite portions when the ferrite portions 1 and 1' are bonded together by the melted glass 5, 5' are released, cracks occur as indicated by 6 in FIG. 2 between the thin films and ferrite portions.

Next, a second problem will be described. In the case of a magnetic head of the type shown in FIG. 2, the glass portions 5, 5' and the soft magnetic thin films 8, 8' are in contact with each other through a magnetic gap material such as $SiO_2$. An example of this type of magnetic head is shown in FIG. 1 in "AUGER SPEC- TROSCOPY ANALYSIS OF METAL/FERRITE INTERFACE LAYER IN METAL-IN-GAP MAGNETIC HEAD; IEEE TRANSACTIONS ON MAGNETICS, Vol 24, No. 6, November 1988". In this arrangement, the bonding strength between the glass portions and the soft thin magnetic films is relatively weak causing a problem to arise in that the strength of the magnetic core chip becomes weak. For instance, in the production of magnetic heads, the sliced chips are subjected to a washing step, and during this step, due to the influence of vibration, about 5% of the core chips are cracked at the joint between the halves of the core. In addition the core chip is subjected to a step in which it is bonded to the head base, and in this step about a few percent of the core chips are cracked.

The strength of the magnetic core chips shown in FIGS. 1 and 2 was confirmed by clamping only one half of the core chip and measuring the force applied to the other half so as to break the chip. The experimental results are as follows. In the case of the head shown in FIG. 1, the average breaking strength of 20 samples was 270 g·f, but in the case of the head shown in FIG. 2, the average breaking strength was 130 g·f or less than one half of the average breaking strength of the head shown in FIG. 1.

From these experimental results, it becomes clear that the greater the area of the interface between the soft magnetic thin films and the glass portions, the weaker the joint strength between the magnetic core halves. In addition, it is confirmed that all the breakages occur along the interfaces between the soft magnetic thin films and the glass portions.

Next, a third problem encountered with a magnetic head of the type shown in FIG. 2 will be described. The core of such a compound type magnetic head comprises ferrite portions 1 and 1' over the surfaces of which the soft magnetic thin films 8 and 8' of Sendust, amorphous or the like are formed so that due to the difference in the coefficients of thermal expansion between them and in the degree of heat resistance of each material, the temperature of the glass 5, 5' being melted for bonding is limited to less than 600° C. For instance, the coefficient of linear expansion a of Mn-Zn single crystal ferrite has an average value of $110 \times 10^{-7}$/°C. in the temperature range 30°–500° C. while Sendust has an average coefficient of linear expansion of $160 \times 10^{-7}$/°C. in the range from 30°–500° C. When a thermal hysteresis in excess of 600° C. is applied, due to the thermal stresses caused by the difference in the coefficients of linear expansion, they tend to crack the ferrite portions and the glass. In the case of a soft magnetic thin films composed of an amorphous alloy, the alloy crystallizes at 500°~550° C. so that the bonding by glass cannot be carried out in excess of the above-mentioned temperature. More specifically, when the temperature of the glass melting is in excess of the above-mentioned temperature range in the bonding process, the soft magnetic property of amorphous alloys is lost so that they cannot be used as materials for magnetic heads.

On the other hand, when the temperature of the glass melting is low, the properties of glass such as water-resistance, weatherability, strength and so on is adversely affected. The reason is as follows. For instance, in the case of the glass of PbO series, in order to lower the welding temperature, the content of the PbO must be increased while the content of $SiO_2$ must be decreased. In this case, $SiO_2$ is one of the compounds subjected to vitrification and if $SiO_2$ is decreased in quantity, the water-resistance, weatherability, anti-environmental-pollution ability and so on are also adversely affected. It follows therefore that, for improving the anti-pollution ability, the first requirement is to increase the temperature in the bonding process (bonding temperatures). In general, in the case of PbO and $V_2O_5$ series glass, the higher the softening temperature, the more the anti-pollution ability is improved. However, in the case of the above-described magnetic head, the temperature of glass at melting cannot be increased, and it becomes impossible to use glass having a high softening temperature so that the anti-pollution ability of the glass used for joining the core halves cannot be satisfactorily improved.

In addition, in the case of PbO series glass, $B_2O_3$ is included for the sake of vitrification while $Bi_2O_3$ is included in order to lower the softening temperature. As compared with PbO, the degradation of the anti-pollution ability is low. It follows that in the case of PbO series glass, $PbO\text{-}SiO_2\text{-}Bi_2O_3\text{-}B_2O_3$ series glass has relatively an excellent degree of water-proofness.

Sometimes ZnO and $Al_2O_3$ are added. In this case, ZnO is effective to improve the water resistance but its wearability is degraded. $Al_2O_3$ improves water resistance, but the softening temperature rises. Therefore it is preferable to combine them at a suitable ratio.

Furthermore, when the halves of a core chip are bonded to each other by glass, firstly, glasses are disposed into a winding groove and a groove defined at the rear portion of each of the cores respectively, and the melted glass flows therein. The distance for which the glass disposed into the groove at the rear portion (to be referred to hereinafter as the back-gap-side glass) flows is considerably longer than the distance for which the glass disposed into the winding groove (to be referred to hereinafter as front-gap-side glass) flows. On the other hand, the above-described glass must have a softening temperature which is as high as possible to optimize the anti-pollution ability of the glass, and must have a low bonding temperature to prevent cracks during the production process. Therefore the bonding temperature must be set at a temperature as low as possible for the front-gap-side glass to reach to the predetermined point by flowing. However, when the glass bonding is carried out at such temperature, sometimes the back-gap-side glass cannot reach a predetermined position. As a result, there arises the problem that the strength of the core chip is decreased and the core chips are cracked during the production process.

SUMMARY OF THE INVENTION

In view of the above, the primary object of the present invention is to provide a magnetic head which can prevent cracking during the production of magnetic core chips and can improve the yield during the production process.

Anther object of the present invention is to provide a magnetic head which has a high degree of strength.

A further object of the present invention is to provide a magnetic head which has an excellent degree of anti-pollution ability and better electromagnetic conversion characteristics.

According to the present invention, the forces of strain caused by the thermal stresses due to the difference in the coefficients of linear expansion between the ferrite core body halves and the soft magnetic thin films which constitute a magnetic core chip, act in the direction inclined by a small angle with respect to the head-side surface (or with respect to a direction perpendicular to the gap extension) so that the rate of occurrence of cracks can be reduced to a minimum.

Furthermore, according to the present invention, it becomes possible to increase the bonding strength between a pair of core halves by making bonding glass directly contact predetermined portions of the ferrite.

Moreover, according to the present invention, the bonding glass with a high softening temperature is deposited on the side of the slide surface of the magnetic head on which the magnetic recording medium slides so that the anti-pollution ability can be improved. In addition, even when the bonding temperature is not so high, the bonding glass deposited on the other portion of the magnetic head can satisfactorily flow to a predetermined position so that the bonding strength of the core can be maintained satisfactorily and the electromagnetic conversion characteristics are not adversely affected.

In the first aspect of the present invention, a magnetic head for writing and/or reading data onto and/or from a magnetic recording medium, comprises:

a core body for defining a magnetic path for writing and reading data;

a pair of magnetic thin films deposited on opposing surfaces including a surface defining a gap, respectively, of the core body, the angle between the surfaces defined by the pair of magnetic thin films except a portion corresponding to the gap and the direction at right angles to the gap being greater than 50 degrees but lower than 80 degrees;

a gap member deposited between the pair of magnetic thin films to define the gap;

a bonding member disposed between the opposing surfaces to bond the opposing surfaces to each other; and a winding wound around a predetermined portion of the core body to exchange the electrical signal related to the data with the magnetic field produced in the magnetic path.

Here, the bonding member may be a glass which is melted to bond the opposing surfaces to each other.

The core body may be made of ferrite.

In the second aspect of the present invention, a head core chip for making up a magnetic head, comprises;

a core body for defining a magnetic path for writing and reading data;

a pair of magnetic thin films deposited on opposing surfaces including a surface defining a gap, respectively, of the core body, the angle between the surfaces defined by the pair of magnetic thin films except a portion corresponding to the gap and the direction at right angles to the gap being greater than 50 degrees but lower than 80 degrees;

a gap member deposited between the pair of magnetic thin films to define the gap; and a bonding member disposed between the opposing surfaces to bond the opposing surfaces to each other.

In the third aspect of the present invention, a magnetic head for writing and/or reading data onto and/or from a magnetic recording medium, comprises;

a core body for defining a magnetic path for writing and reading data, being made up of a pair of core body halves having surfaces opposing each other, and having two grooves formed on each of the opposing surfaces;

a pair of magnetic thin films deposited on the opposing surfaces except a bottom of one of the two grooves respectively;

a gap member deposited between the pair of magnetic thin films to define a gap;

a bonding member at least disposed between the portions to bond the pair of core body halves to each other; and a winding wound around one of the two grooves of the core body to exchange the electrical signal related to the data with the magnetic field produced in the magnetic path.

Here, the bonding member may be a glass which is melted to bond the opposing surfaces each other.

One of the two grooves may be located in an end of each of the opposing surfaces, and the winding may be wound around the other of the two grooves.

The core body may be made of ferrite.

In the forth aspect of the present invention, a head core chip for making up a magnetic head, comprises;

a core body for defining a magnetic path for writing and reading data, being made up of a pair of core body halves having surfaces opposing each other, and having two grooves formed on each of the opposing surfaces;

a pair of magnetic thin films deposited on the opposing surfaces except a bottom of one of the two grooves respectively;

a gap member deposited between the pair of magnetic thin films to define a gap; and a bonding member at least deposed between the portions to bond the pair of core body halves to each other.

In the fifth aspect of the present invention, a magnetic head for writing and/or reading data onto and/or from a magnetic recording medium, comprises;

a core body for defining a magnetic path for writing and reading data, being made up of a pair of core body halves having surfaces opposing each other, and having two grooves formed on each of the opposing surfaces;

a pair of magnetic thin films deposited on the opposing surfaces respectively;

a gap member disposed between the pair of magnetic thin films to define a gap;

a first bonding glass disposed in the portion closer to the gap than one groove closer to the gap of the two grooves to bond the pair of core body halves each other;

a second bonding glass disposed in the portion further from the gap than the one groove to bond the pair of core body halves each other, having softening temperature lower than that of the first bonding glass; and a winding wound around the groove of the core body to exchange the electrical signal related to the data with the magnetic field produced in the magnetic path.

Here, the softening temperature of the second bonding glass may be lower by 5 degrees–50 degrees than that of the first bonding glass.

The core body may be made of ferrite.

In the sixth aspect of the present invention, a head core chip for making up a magnetic head, comprises;

a core body for defining a magnetic path on the writing and reading data, being made up of a pair of core body halves having opposing surfaces each other, having two grooves formed on each of the opposing surfaces;

a pair of magnetic thin films deposited on the opposing surfaces respectively;

a gap member disposed between the pair of magnetic thin films to define a gap;

a first bonding glass disposed in the portion closer to the gap than one groove closer to the gap of the two grooves to bond the pair of core body halves each other; and a second bonding glass disposed in the portion further from the gap than the one groove to bond the pair of core body halves each other, having softening temperature lower than that of the first bonding glass.

The above and other objects, effects, features and advantages of the present invention will become more apparent from the following description of embodiments thereof taken in conjunction with the accompanying drawings.

BRIEF DESCRIPTION OF THE DRAWINGS

FIG. 15 is a perspective view illustrating a magnetic head made by using the core chip shown in FIG. 10 and securely attached to a base;

FIG. 16 is a perspective view used to explain the production steps of a magnetic core of a third embodiment of the present invention;

DETAILED DESCRIPTION OF PREFERRED EMBODIMENTS

Figure 1:
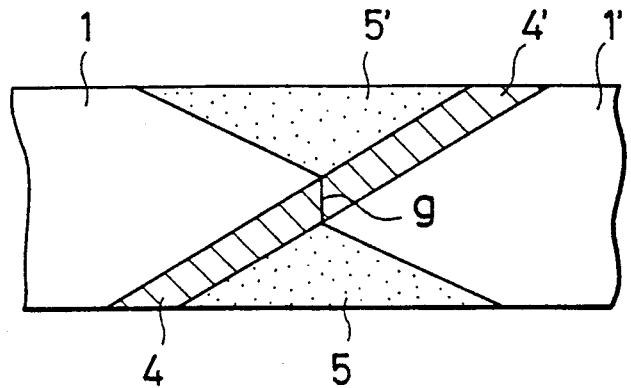
FIG. 1 is a plan view of the slide surface of a conventional magnetic head.

Referring first to FIGS. 3-9, a first embodiment of the present invention will be described. FIG. 1 is a plan view illustrating a portion of the slide surface of the magnetic head (core) of the first embodiment on which the magnetic recording medium slides and in which reference numerals used in FIG. 2 plus 10 are used to represent similar portions and the like. A significant difference between the prior art magnetic head illustrated in FIG. 2 and the first embodiment of the present invention resides in the fact that the angle $\theta_1$ between the surfaces upon which soft magnetic thin films 18 and 18' are formed on the one hand and an end surface of the magnetic head on the other hand is made greater than the angle $\theta_0$ shown in FIG. 2. The direction of the end surface is perpendicular to an extension of gap g.

The magnetic head used for FDD having a slide surface of the type described above was made on an experimental bases and its performance was evaluated. Referring now to FIGS. 4-9, its production steps will be described in detail.

Figure 4:
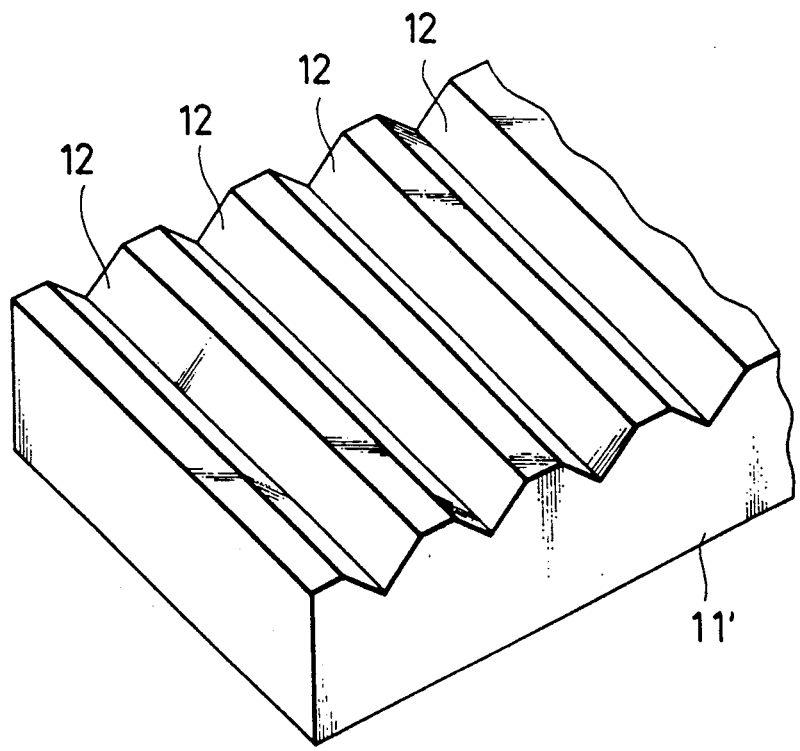
FIGS. 4-9 are perspective views used to explain the production steps of a magnetic core chip of the first embodiment.

First, as shown in FIG. 4, a block 11' consisting of ferrite is lapped until it has a mirror surface and then track grooves 12 which define the track width are formed or machined by a grinder.

Figure 5:
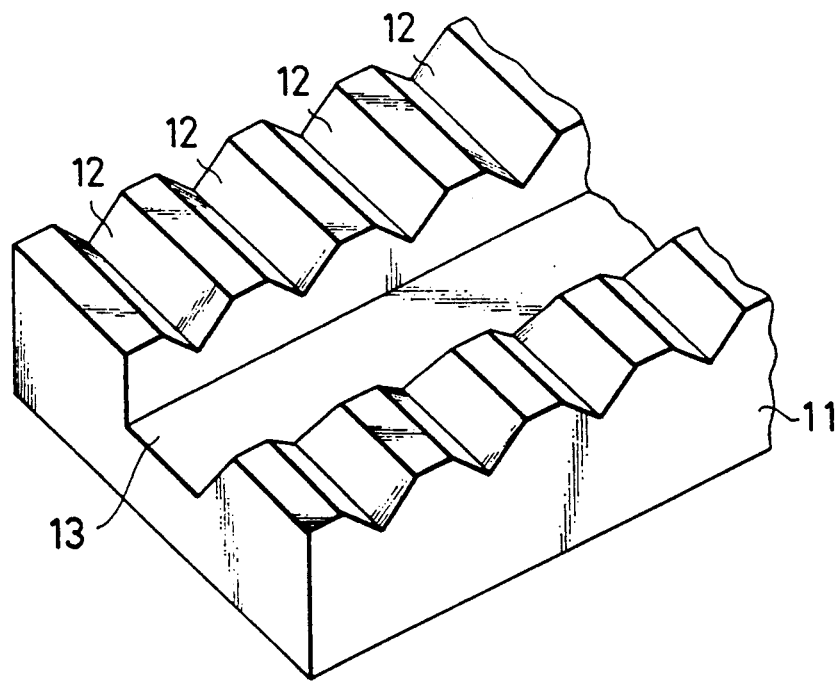
Figure 6:
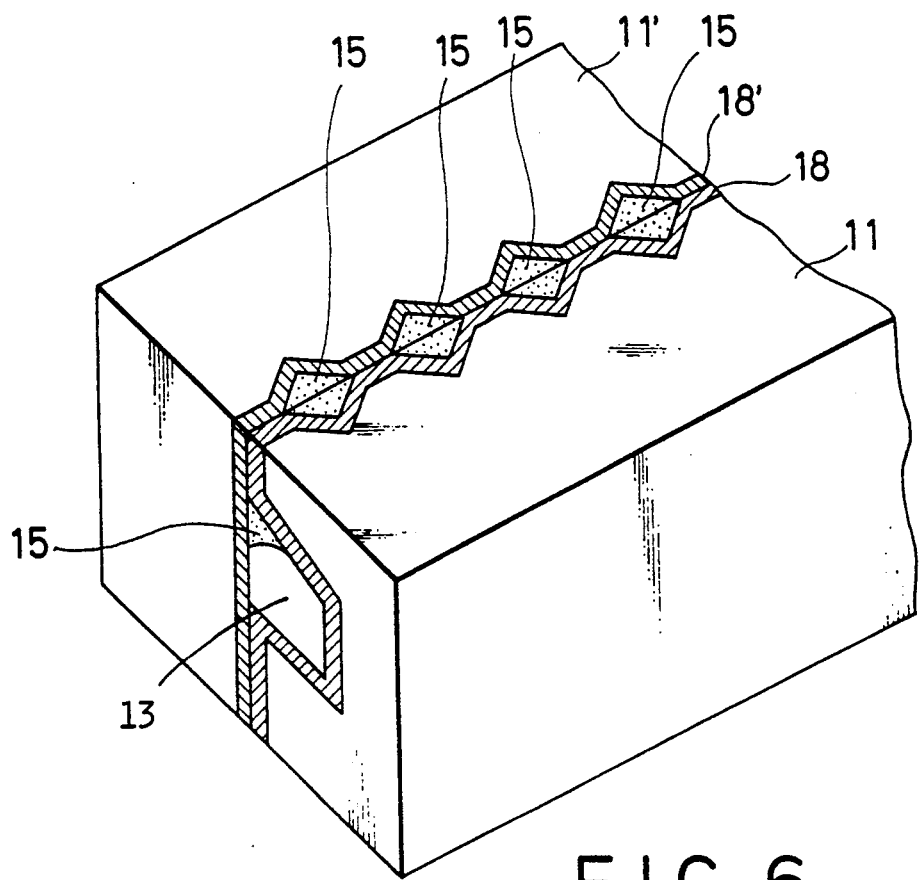
Figure 7:
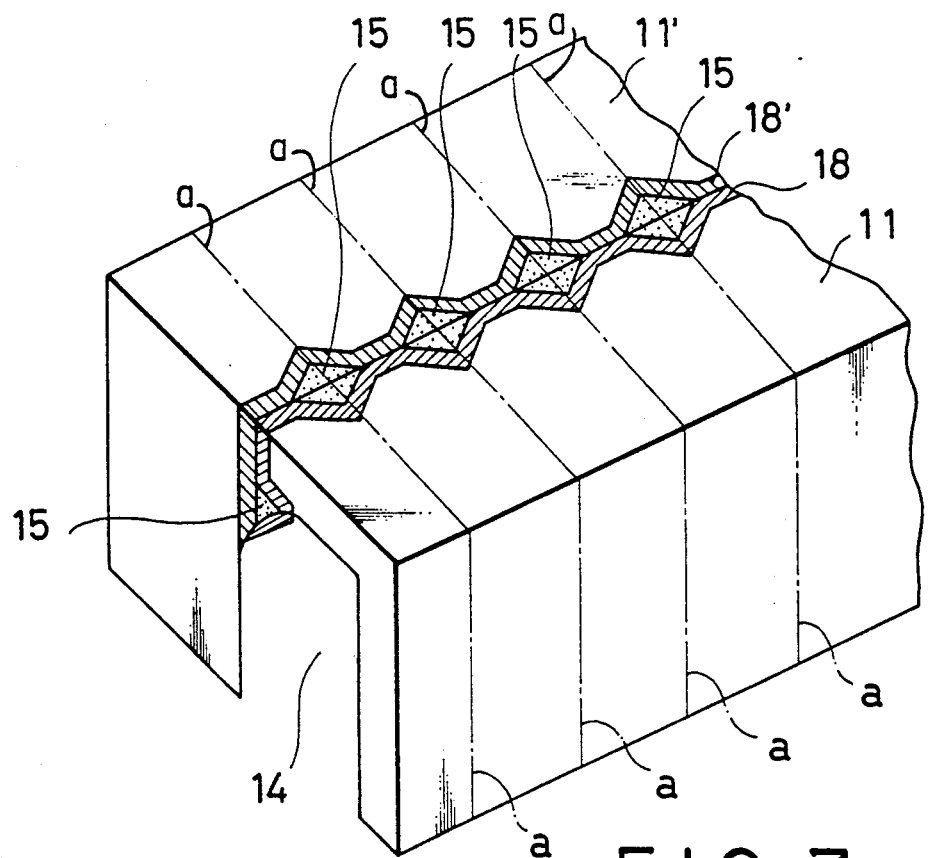
Figure 8:
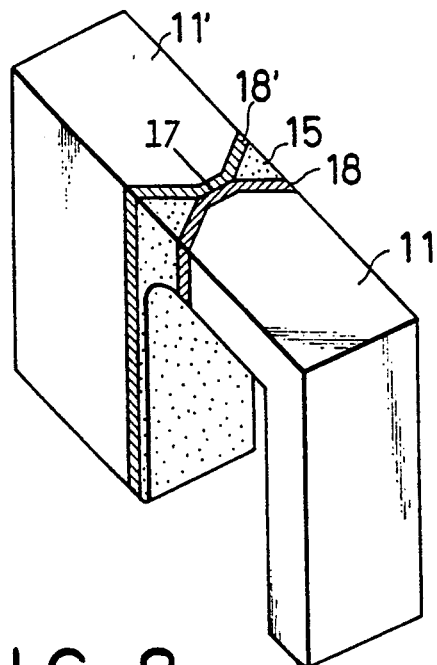

Next, as shown in FIG. 5, a winding groove 13 in which is disposed a coil bobbin is formed in a manner substantially similar to that described above. Thereafter, Sendust films 18 and 18' are deposited as soft magnetic thin films over the surfaces of the block 11' shown in FIG. 4 and the block 11 shown in FIG. 5 by the sputtering process until they have a thickness of 10 μm. Next $SiO_2$ films (0.11 μm in thickness) are deposited over the surfaces of the films 18 and 18' as the magnetic gap 17. The blocks 11' and 11 are butted against each other through the gap 17 and then bonded securely together by bonding glass 15, whereby a block assembly as shown in FIG. 6 is obtained. Next a surface of the block assembly which becomes the slide surface is polished so as to become a mirror surface and thereafter the back groove 14 shown in FIG. 7 is formed. Next the block assembly is sliced along the one-dot chain lines a—a shown in FIG. 7, whereby the magnetic core chip shown in FIG. 8 is obtained.

Figure 9:
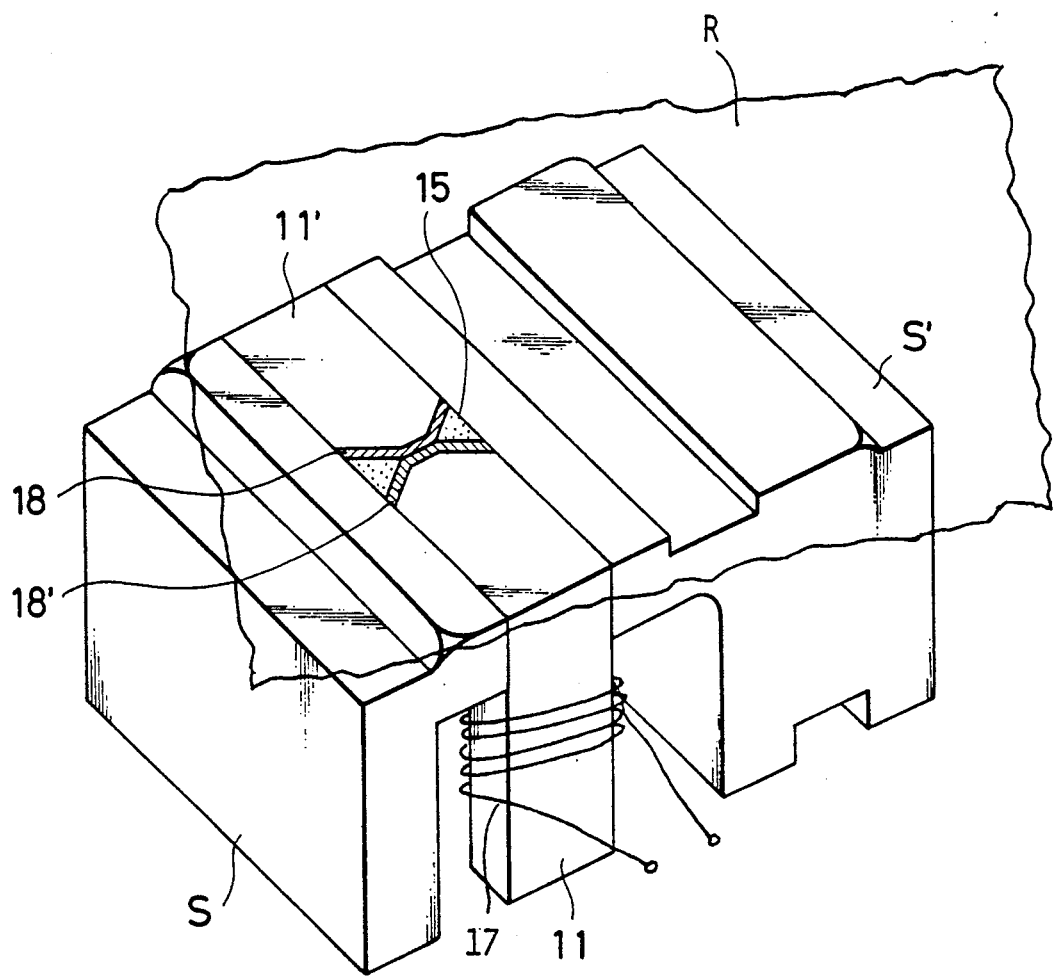

In this type of magnetic head for FDD, both side surfaces of the core chip are further lapped to become a mirror surface and the core chip is sandwiched by ceramic S and S' called a slider, as shown in FIG. 9. FIG. 9 also illustrates the position of a recording magnetic medium R relative to the magnetic head, and a winding 17.

Figure 2:
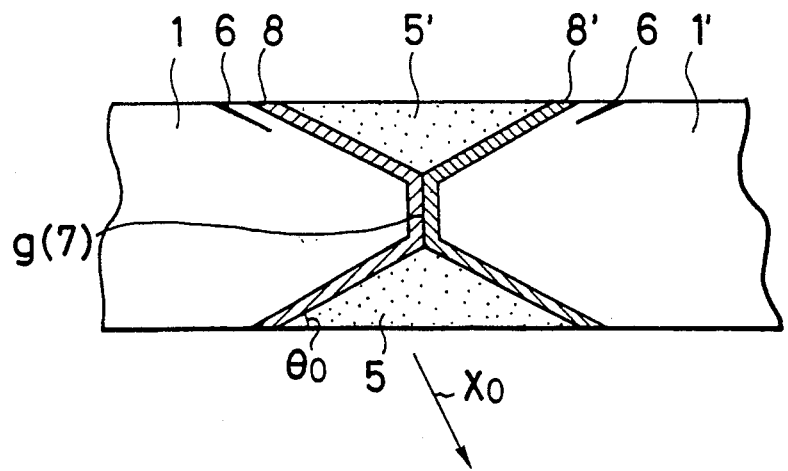
FIG. 2 is a plan view of the slide surface of another conventional magnetic head.
Figure 3:
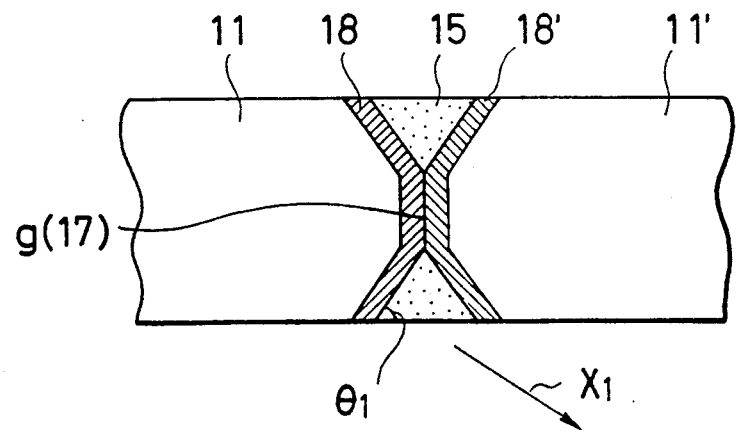
FIG. 3 is a plan view showing a slide surface of a magnetic head of a first embodiment of the present invention.

The magnetic core chip is produced in the manner described above. The angle $\theta$ between the surface of the soft magnetic thin film and the end surface of the core chip as shown in FIGS. 2 and 3 was varied in order to investigate how the crack 6 occurs more often at the sides of the ferrites than the interface between the Sendust film and the surface of the ferrite portion. The angle $\theta$ is determined by the shape of the grinder for defining the track width so that the angle $\theta$ can be freely selected.

| $\theta$ | 30° | 45° | 55° | 70° | 80° |
|---|---|---|---|---|---|
| incident of cracking | 100% | 96% | 9% | 5% | 0% |

As shown in Table 1, when $\theta$ is between 30 and 45 degrees, the incidence of cracking is extremely high, but when $\theta$ is in excess of 70 degrees, the incidence of cracking is suddenly decreased.

Furthermore, the inventor investigated at which production step cracks occurs and found that almost all cracks occur in the block assembly slicing step. A possible but not yet proved explanation is that the strain caused by the thermal stresses produced due to the difference in the coefficients of linear expansion between the Sendust films or the soft magnetic thin films on the one hand and the ferrite on the other hand, is released when the block assembly is sliced.

It follows that when the angle between the film surface and the side surface as shown in FIG. 2 becomes a relatively smaller angle $\theta_0$, the strain produced by the thermal stresses acts in the direction substantially perpendicular to the side surface (indicated by the arrow $X_0$ in FIG. 2) so that cracks tend to occur. On the other hand, when the angle as shown FIG. 3 becomes a larger angle $\theta_1$, the strain acts in the direction nearly parallel to the side surface (indicated by the arrow $X_1$ in FIG. 3) so that cracks rarely occur.

The incidence of cracks of, about 10% is tolerable, and therefore from Table 1 the angle $\theta_1$ is determined to be greater than 50 degrees and preferably less than 80 degrees so that no electromagnetic conversion takes place between the Sendust films 18 and 18' outwardly of the track width; that is, outwardly of the portion where the gap g exists. It follows that the ideal range of $\theta_1$ is between 50-80 degrees.

So far the present invention has been described with reference to a magnetic head for FDD, but it is to be understood that the present invention may be equally applied to a head for VTR and the like and the same advantages may be attained.

Next, referring to FIGS. 10-15, the second embodiment of the present invention will be described in detail.

Figure 10:
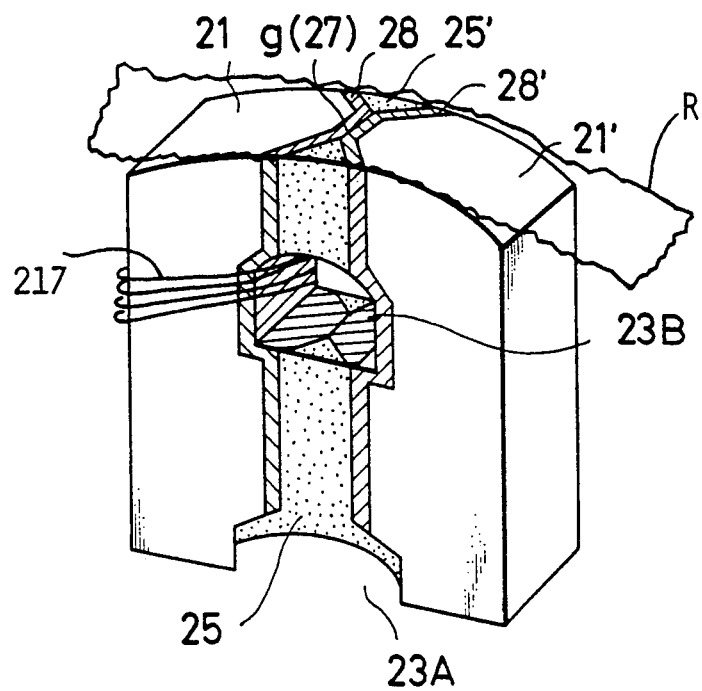
FIG. 10 is a perspective view illustrating a magnetic core of a second embodiment of the present invention.

FIG. 10 is a perspective view illustrating the construction of the core of the second embodiment for use with a magnetic recording medium R, and the reference numerals used in FIG. 2 plus 20 are used to designate similar parts or portions in FIGS. 10~15. In the case of the magnetic core of the second embodiment, winding groove 23B for receiving a winding 17 and glass groove 23A are formed on the opposing surfaces of each core half and soft magnetic thin films 28 and 28' are respectively deposited over the opposing surfaces except the bottom surfaces of the glass groove 23A. At the bottom surfaces, the bonding glass 25 and 25' can directly contact ferrite chips 21 and 21' so that the bonding strength between the ferrite chips 21 and 21' can be increased.

Next, a process for the production of the magnetic core of the type described above with reference to FIG. 10 will be described in detail with reference to FIG. 11-14.

Figure 11:
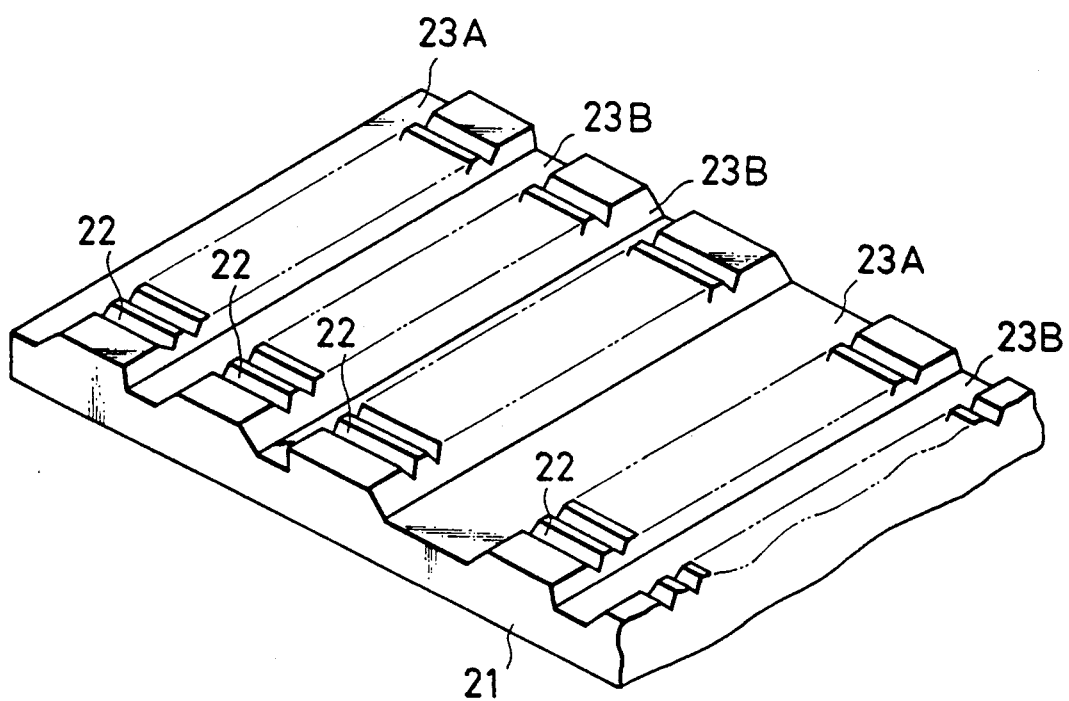
FIGS. 11-14 are perspective views, respectively, used to explain the production steps of the magnetic core chip of the second embodiment.

First as shown in FIG. 11, the surface of the ferrite block 21 is so lapped as to have a mirror surface, and track grooves 22 each of which defines the track width, recesses for winding grooves 23B into each of which a coil is disposed and recesses for glass grooves 23A into each of which a rod of glass is disposed when the glass bonding surfaces are formed or machined by the grinding machine.

Figure 12:
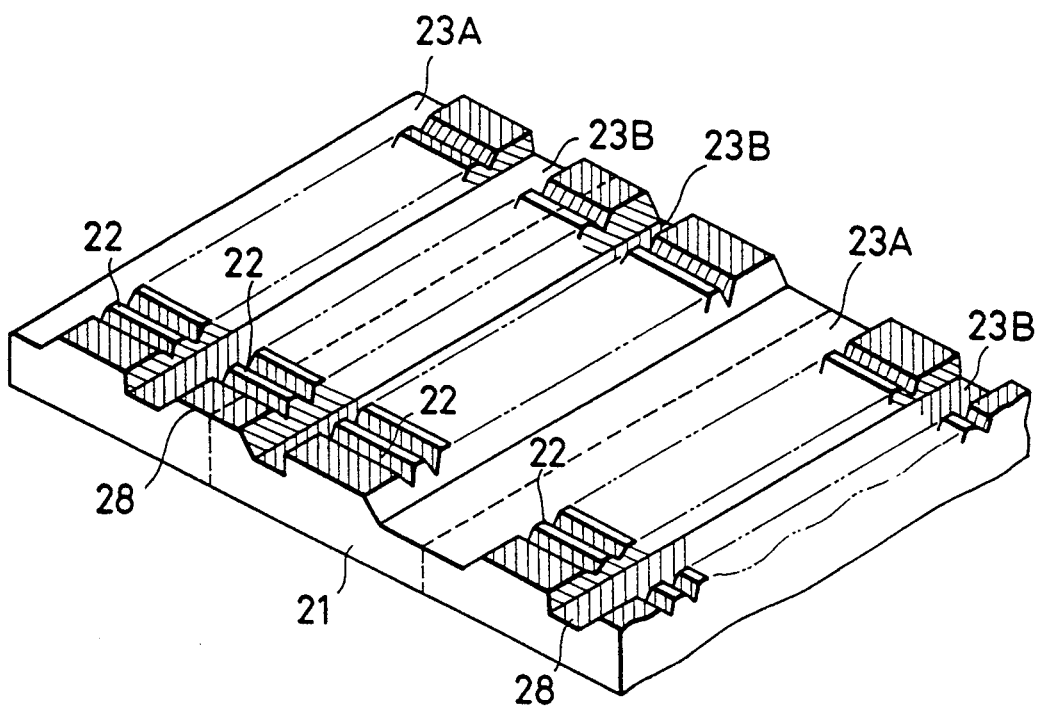

Thereafter, as shown in FIG. 12, Sendust films 28 are deposited to the thickness of 20 μm by the sputtering process, while the bottom surface of each glass groove 23A is masked. Moreover, the magnetic gap materials consisting of SiO$_2$ are deposited to the thickness of 0.1 μm.

Figure 13:
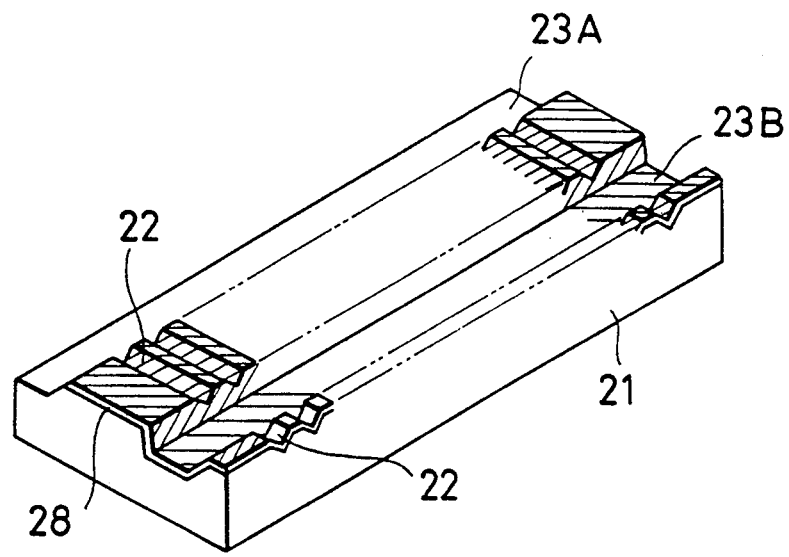
Figure 14:
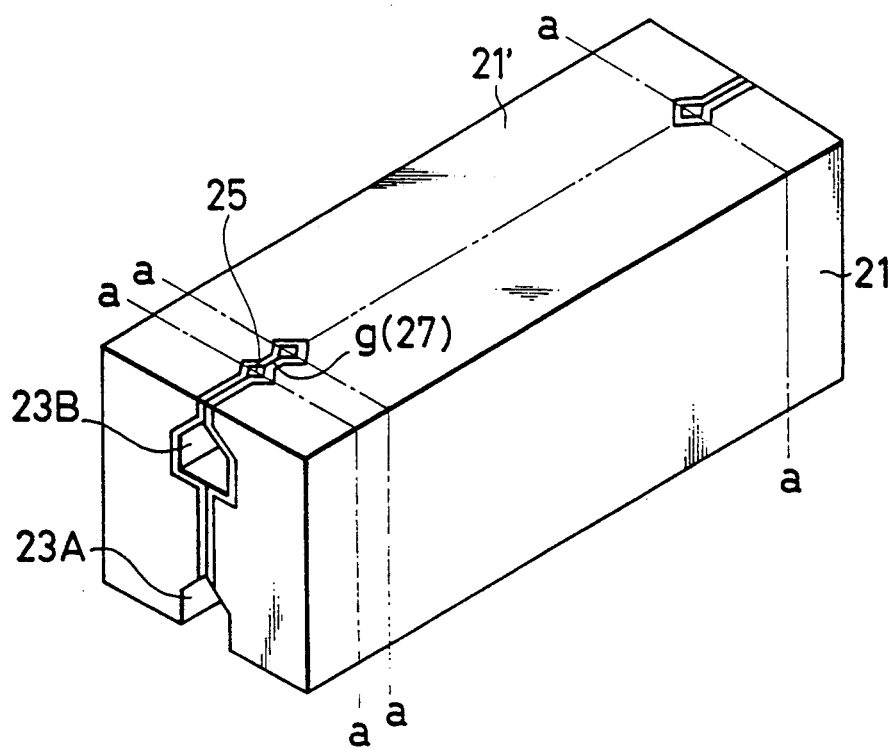

Next, the block 21 thus produced is sliced along the broken lines as shown in FIG. 12, whereby the semicore block shown in FIG. 13 is obtained. Thereafter, a pair of semi-core blocks are abutted against each other as shown in FIG. 14 and the rods of glass (not shown) are inserted into the winding groove 23B and the glass groove 23A. The block assembly thus constructed is maintained at 570° C. for 60 minutes to obtain glass bonding so that the semi-core blocks are securely joined with each other. Then the core block thus constructed is subjected to grinding machining so that the slide surface is finished to the surface of the radius of curvature R1. Next, the core block is sliced along the one-dot chain lines a—a, whereby the head core chip as shown in FIG. 10 can be obtained.

Next, as shown in FIG. 15, the core chip is securely bonded to a base 215 and the end of the winding 217 is electrically connected to a printed circuit board 218 on the base 215. The magnetic head thus constructed is securely attached to the body of a unit by a screw screwed into a tapped hole 216.

The incidence of cracking of magnetic heads thus constructed becomes substantially 0% at the washing step and the bonding step shown in FIG. 15.

The strength of the magnetic head of the second embodiment was 200 g·f when measured by the procedure described above. As compared with the magnetic head in which the soft magnetic thin film is deposited over the whole of the bottom surface of the glass groove 23A and which has the strength of 130 g·f, the bonding strength of the second embodiment of the present invention is considerably higher. In the second embodiment of the present invention, it has been described that the construction of the slide surface is applied to magnetic head of the type shown in FIG. 2, but it is to be understood that the second embodiment of the present invention can be equally applied to magnetic heads of different construction in which the thin metal magnetic film is interposed between the ferrite portion and that the bonding glass portion and the same effects as those of the second embodiment can be attained.

Referring now to FIGS. 16-21, a third embodiment of the present invention will be described in detail. The third embodiment is substantially similar in arrangement and production process to the second embodiment so that no description shall be made, but it is different from the second embodiment in that the soft magnetic thin film is deposited over the bottom surface of the glass groove. However, the ferrite portion and the bonding glass portion may be directly joined with each other as described concerning the second embodiment instead of interposing the soft magnetic thin film between them. Then due to the synergistic effects of the second and third embodiments of the present invention, the bonding strength of the core chips can be further increased. In FIGS. 16-19, the reference numerals used in FIG. 1 plus 30 are used to designate similar portions or parts.

In the third embodiment, the winding groove and the glass groove are defined on the head core halves respectively. As shown, in FIG. 16, a rod of glass G2 having a low softening temperature is inserted into the glass groove while a rod of glass G1 having a high softening temperature is inserted into the winding groove.

More specifically, the bonding glass G1 consists of PbO (60% by weight), SiO$_2$ (23%), Bi$_2$O$_3$ (11%) and B$_2$O$_3$ (6%) and its transition temperature is 386° C., its yielding temperature is 425° C. and its softening temperature is 477° C. The bonding glass G2 consists of PbO (65% by weight), SiO$_2$ (18%), Bi$_2$O$_3$ (7%) and B$_2$O$_3$ (10%) and its transition temperature is 376° C., its yielding temperature, 416° C. and its softening temperature, 450° C. These glasses were used for bonding, and the glass bonding was carried out at 570° C. for 40 min.

Next, the features of the production process of the magnetic head cores in accordance with the third embodiment will be described with reference to FIG. 16. As shown in FIG. 16, a pair of the core halves were abutted against each other, and a rod of bonding glass G1 was inserted into the winding groove 33B while a rod of bonding glass G2 was inserted into the glass groove 33A. Then the glass bonding was carried out at 570° C. for 40 min. Thereafter, the slide surface of the core block was ground by a grinding machine having a cylindrical grindstone so that the slide surface was curved or rounded. Next, the core block was sliced along the one-dot chain lines a—a, whereby the head core chip was obtained.

Next, for the sake of comparison, the compositions of the bonding glass G1 and G2 and the conditions of the glass bonding were varied so as to obtain various magnetic head cores by following the above described procedure.

Figure 17:
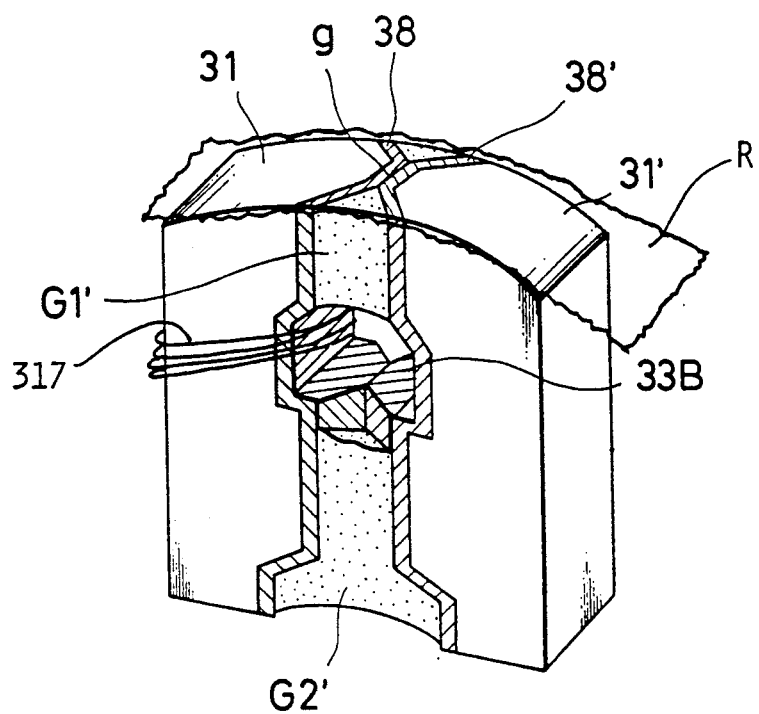
FIGS. 17 and 18 are perspective views illustrating, respectively, a magnetic core in which the glass materials used for bonding are varied.

In FIG. 17, the composition of both the bonding glass G1' and G2' were the same as that of the bonding glass G1 shown in FIG. 16 and the glass bonding was carried out at 540° C. for 40 min.

As shown in FIG. 17, in the case of the magnetic head core, the melted bonding glass G2 failed to flow to a portion in the vicinity of the winding groove 33B in which winding 317 is wound.

Next, by using the same material described above, the glass bonding was carried out at 580° C. for 80 min which was twice as long as the above-described glass bonding time. However, the flow of the bonding glass G2 was more or less improved, but failed to reach a predetermined point. In this case, the so-called intrusion phenomenon in which the Sendust films 38 and 38' are dissolved in the bonding glass so that the width of the track is shortened results at the portion indicated by 315 in FIG. 19. Thus such core construction is not preferable.

Figure 18:
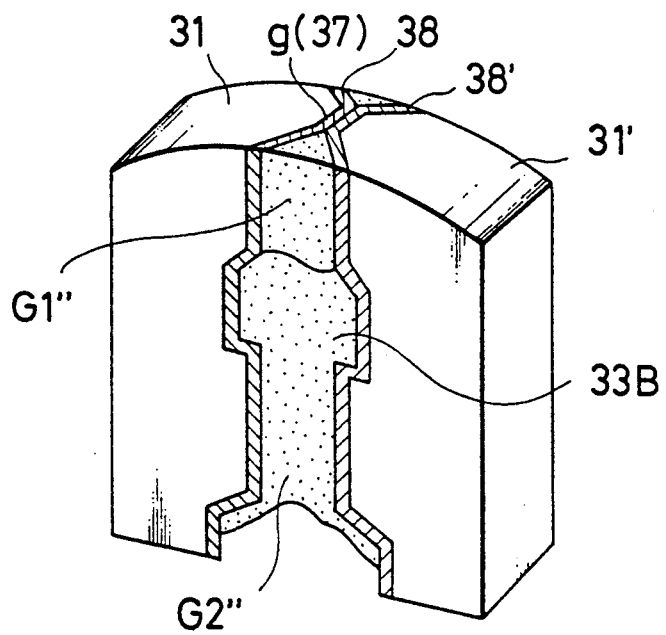
Figure 19:
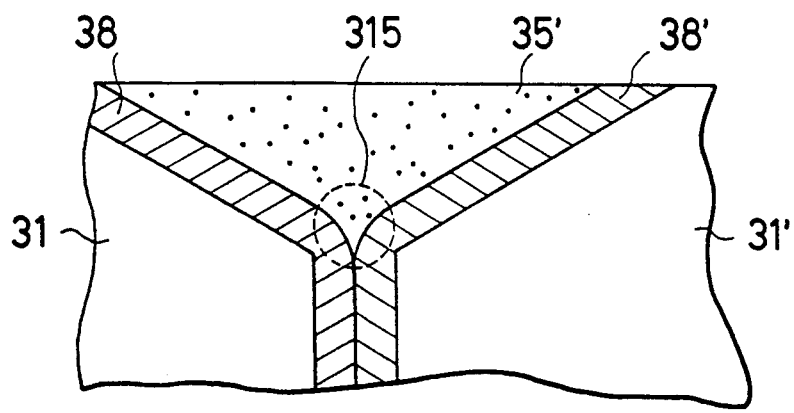
FIG. 19 is a plan view illustrating a portion of a magnetic core in order to explain the intrusion phenomenon.

In the third experiment, the composition of the bonding glass G1'' was same as that of the bonding glass used in FIG. 16, but the bonding glass G2'' consisted of PbO (70%), $SiO_2$ (15%), $Bi_2O_3$ (7%) and $B_2O_3$ (8%), all of the percentages being expressed by weight, and its transition temperature was 365° C., the yielding temperature, 405° C. and the softening temperature, 415° C. The glass bonding was carried out at 570° C. for 40 min. The magnetic head core thus obtained is illustrated in FIG. 18. As shown in FIG. 18, in the head core chip, the winding groove 33B is filled with the bonding glass G2''.

Figure 20:
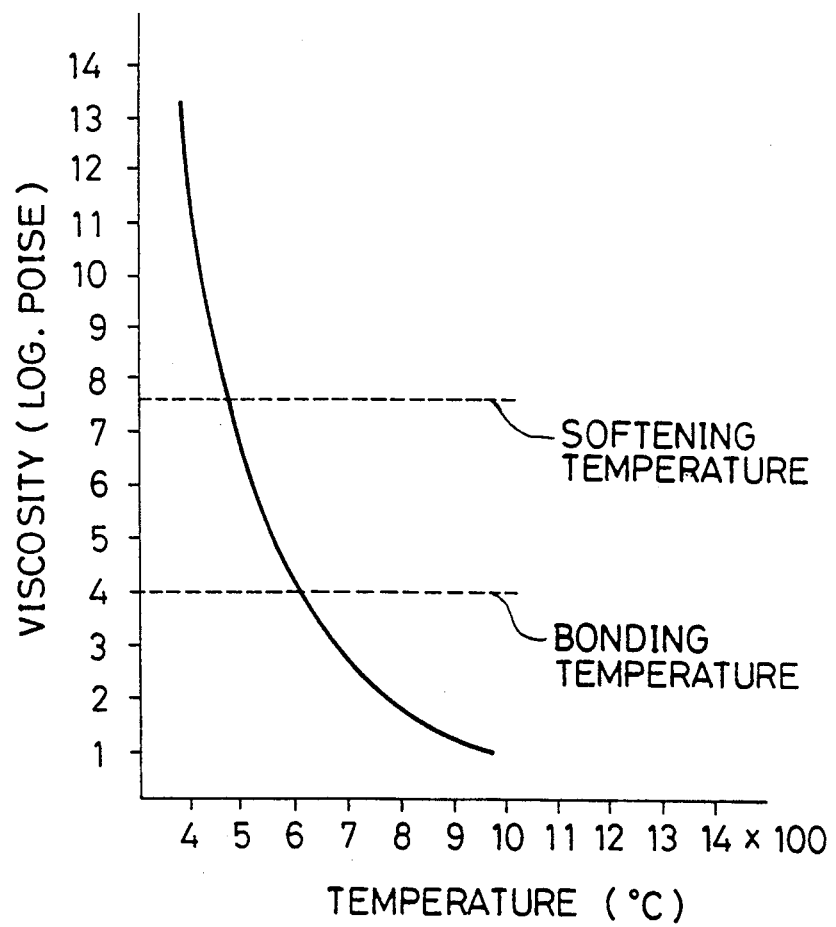
FIG. 20 is a graph illustrating the relationship between the viscosity of glass and temperature.

As is clear from the above description, the suitable difference in softening temperature between the bonding glass deposited in the portion closer to the gap than the winding groove and the bonding glass deposited in the portion further from the gap than the winding groove is from 5° to 50° C. If the difference is less than 5° C., the latter bonding glass failed to reach a predetermined point. On the other hand, when the difference is in excess of 50° C., the melted bonding glass flows into the winding groove and fills it. Such phenomena result in the case of PbO and $V_2O_5$ series bonding glass. For the sake of reference, a curve indicating the relationship between the viscosity of bonding glass and the temperature is illustrated in FIG. 20. In the figure, the temperature at which the viscosity is $10^{7.6}$ poise is called the softening temperature.

Figure 21:
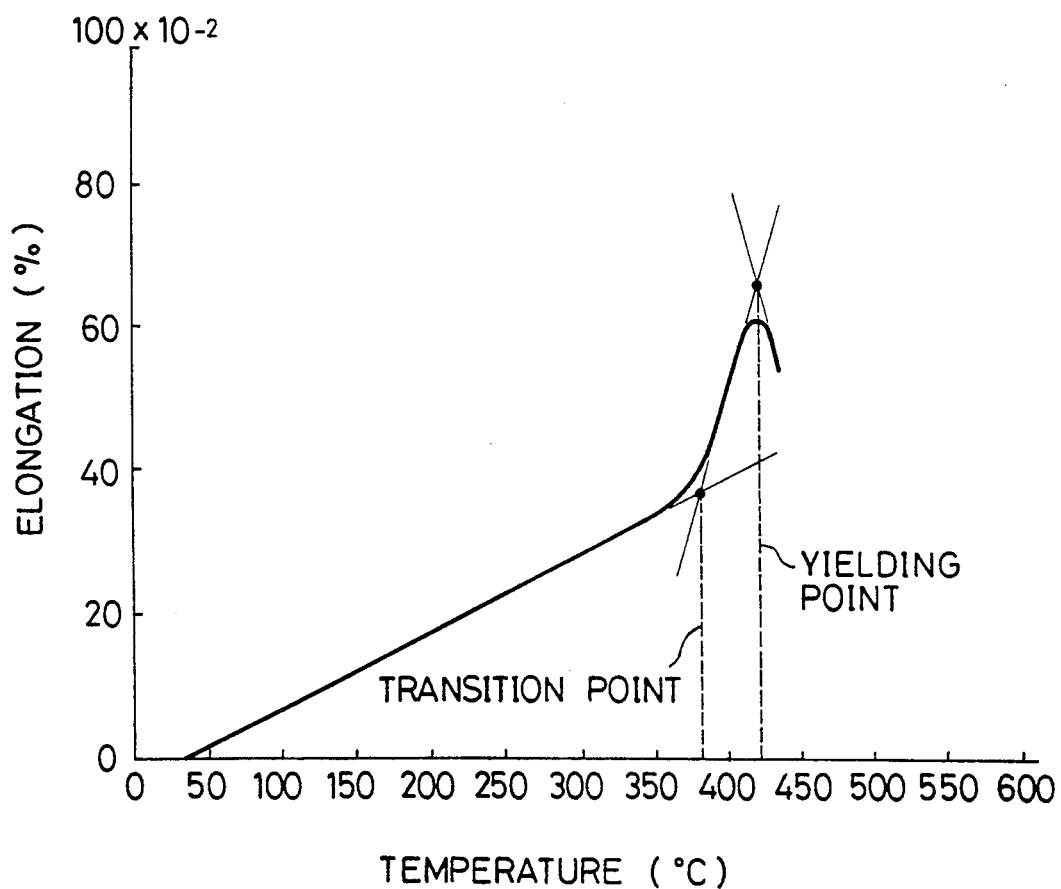
FIG. 21 is a graph illustrating the relationship between the glass temperature and elongation.

Furthermore, the relationship between the temperature and elongation is indicated by the curve shown in FIG. 21. The coefficient of expansion suddenly changes about 380° C. which is called the transition temperature of glass. When the temperature is further raised, the increase in elongation is interrupted about 420° C. and the bonding glass yields under a predetermined load. This temperature is called the yielding temperature. In general, in the case of glass bonding, the transition temperature, the yielding temperature, the softening temperature and the bonding temperature rise in the order named.

It is to be understood that the construction of the magnetic head in accordance with the present invention is not limited to the above-described embodiments and that the present invention may be equally applied to compound type magnetic heads of the type in which the soft magnetic thin films are deposited on the opposing surfaces of the magnetic oxide materials which define the magnetic gap therebetween. Then, the same effects of the present invention can be attained.

In addition, it is known in the art that the magnetic head has a winding which is wound on to the head core and used for exchanging an electrical signal with the magnetic field defined in the head core, therefore, detailed descriptions of the winding have not been made.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A magnetic head for writing and/or reading data onto and/or from a magnetic recording medium, comprising:
   a core body defining a magnetic path having a magnetic gap for writing and/or reading data, said core body including a pair of core body halves each having a surface opposing a corresponding surface on the other core body half;
   a pair of magnetic thin films deposited on the opposing surfaces of said core body halves, each of said opposing surface including a first surface aligned in a longitudinal direction along said magnetic gap and second surfaces between which said first surface is located, said pair of magnetic thin films being deposited on all of said first surface and said second surfaces, the thickness of each of said magnetic thin films being more than 5 μm and less than 10 μm, and an angle between each of the second surfaces and a direction at right angles to said longitudinal direction being greater than 50° and less than 80°;
   a gap member deposited between said pair of magnetic thin films to define said magnetic gap;
   a bonding member disposed between said opposing surfaces to bond said opposing surfaces to each other; and
   a winding wound around said core body to exchange an electrical signal related to said data with a magnetic field produced in said magnetic path.

2. A magnetic head as claimed in claim 1, wherein said bonding member is a glass which is melted to bond said opposing surfaces to each other.

3. A magnetic head as claimed in claim 2, wherein said core body is made of ferrite.

4. A magnetic core chip for making up a magnetic head, comprising:
   a core body defining a magnetic path having a magnetic gap for writing and/or reading data, said core body including a pair of core body halves each having a surface opposing a corresponding surface on the other core body half;
   a pair of magnetic thin films deposited on the opposing surfaces of said core body halves, each of said opposing surfaces including a first surface aligned in a longitudinal direction along said magnetic gap and second surfaces between which said first surface is located, said pair of magnetic thin films being deposited on all of said first surface and said second surfaces, the thickness of each of said magnetic thin films being more than 5 μm and less than 10 μm, and an angle between each of the second surfaces and a direction at right angles to said longitudinal direction being greater than 50° and less than 80°;

a gap member deposited between said pair of magnetic thin films to define said magnetic gap; and a bonding member disposed between said opposing surfaces to bond said opposing surfaces to each other.

5. A magnetic head for writing and/or reading data onto and/or from a magnetic recording medium, comprising:

a core body defining a magnetic path having a magnetic gap for writing and/or reading data, said core body including a pair of core body halves each having a surface opposing a corresponding surface on the other core body half, and having first and second grooves formed on said opposing surfaces, said first groove being located on an inner side of said magnetic path, and said second groove being located in an end of said opposing surfaces located on an outer side of said magnetic path;

a pair of magnetic thin films deposited on said opposing surfaces except on a bottom of said second groove;

a gap member deposited between said pair of magnetic thin films to define said magnetic gap;

a bonding member disposed at least in said second groove to bond said pair of core body halves to each other; and a winding wound around said first groove of said core body to exchange an electrical signal related to said data with a magnetic field produced in said magnetic path.

6. A magnetic head as claimed in claim 5, wherein said bonding member is a glass which is melted to bond said opposing surfaces to each other.

7. A magnetic head as claimed in claim 5, wherein one of said two grooves is located in an end of each of said opposing surfaces, and said winding is wound around the other of said two grooves.

8. A magnetic head as claimed in claim 7, wherein said core body is made of ferrite.

9. A head core chip for making up a magnetic head, comprising:

a core body defining a magnetic path having a magnetic gap for writing and/or reading data, said core body including a pair of core body halves each having a surface opposing a corresponding surface on the other core body half, and having first and second grooves formed on said opposing surfaces, said first groove being located on an inner side of said magnetic path, and said second groove being located in an end of said opposing surfaces located on an outer side of said magnetic path;

a pair of magnetic thin films deposited on said opposing surfaces except on a bottom of said second groove;

a gap member deposited between said pair of magnetic thin films to define said magnetic gap; and a bonding member disposed at least in said second groove to bond said pair of core body halves to each other.

10. A magnetic head for writing and/or reading data onto and/or from a magnetic recording medium, comprising:

a core body defining a magnetic path having a magnetic gap for writing and/or reading data, said core body including a pair of core body halves each having a surface opposing a corresponding surface on the other core body half, and having first and second grooves formed on said opposing surfaces, said first groove being located on a inner side of said magnetic path, and said second groove being located in an end of said opposing surfaces located on an outer side of said magnetic path, said first groove being located on a portion of an opposing surface closer to said magnetic gap than said second groove:

a pair of magnetic thin films deposited on said opposing surfaces respectively;

a gap member disposed between said pair of magnetic thin films to define said magnetic gap;

a first bonding glass disposed only in a portion of said opposing surfaces closer to said magnetic gap than said first groove to bond said pair of core body halves to each other;

a second bonding glass disposed only in a portion of said opposing surfaces further from said magnetic gap than said first groove to bond said pair of core body halves to each other, said second bonding glass having a softening temperature lower than that of said first bonding glass; and a winding wound around said first groove of said core body to exchange an electrical signal related to said data with a magnetic field produced in said magnetic path.

11. A magnetic head as claimed in claim 10, wherein the softening temperature of said second bonding glass is lower by 5 degrees ~ 50 degrees than that of said first bonding glass.

12. A magnetic head as claimed in claim 11, wherein said core body is made of ferrite.

13. A head core chip for making up a magnetic head, comprising:

a core body defining a magnetic path having a magnetic gap for writing and/or reading data, said core body including a pair of core body halves each having a surface opposing a corresponding surface on the other core body half, and having first and second grooves formed on said opposing surfaces, said first groove being located on an inner side of said magnetic path, and said second groove being located in an end of said opposing surfaces located on an outer side of said magnetic path, said first groove being located on a portion of an opposing surface closer to said magnetic gap than said second groove:

a pair of magnetic thin films deposited on said opposing surfaces respectively;

a gap member disposed between said pair of magnetic thin films to define said magnetic gap;

a first bonding glass disposed only in a portion of said opposing surfaces closer to said magnetic gap than said first groove to bond said pair of core body halves to each other; and a second bonding glass disposed only in a portion of said opposing surfaces further from said magnetic gap than said first groove to bond said pair of core body halves to each other, said second bonding glass having a softening temperature lower than that of said first bonding glass.

* * * * *